US010415478B2

(12) United States Patent
Schwarz et al.

(10) Patent No.: US 10,415,478 B2
(45) Date of Patent: Sep. 17, 2019

(54) AIR MIXING SYSTEMS HAVING MIXING CHAMBERS FOR GAS TURBINE ENGINES

(71) Applicant: United Technologies Corporation, Farmington, CT (US)

(72) Inventors: Frederick M. Schwarz, Glastonbury, CT (US); James D. Hill, West Abington Township, PA (US); William K. Ackermann, East Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 303 days.

(21) Appl. No.: 15/332,249

(22) Filed: Oct. 24, 2016

(65) Prior Publication Data

US 2017/0037782 A1  Feb. 9, 2017

Related U.S. Application Data

(63) Continuation-in-part of application No. 14/600,862, filed on Jan. 20, 2015, now Pat. No. 10,100,738.

(51) Int. Cl.
*F02C 7/18* (2006.01)
*F02C 3/04* (2006.01)
(Continued)

(52) U.S. Cl.
CPC ............... *F02C 7/18* (2013.01); *F01D 5/082* (2013.01); *F02C 3/04* (2013.01); *F01D 9/02* (2013.01);
(Continued)

(58) Field of Classification Search
CPC .... F02C 7/12; F02C 7/18; F02C 7/185; F02C 6/08; F02C 6/18; F23R 3/04; F23R 3/045;
(Continued)

(56) References Cited

U.S. PATENT DOCUMENTS 4,657,482 A * 4/1987 Neal .................. F02C 7/18
                                                    415/116
6,050,079 A * 4/2000 Durgin ................ F01D 5/082
                                                    415/115
(Continued)

FOREIGN PATENT DOCUMENTS

EP     0203431       12/1986
EP     3048250 A1    7/2016

OTHER PUBLICATIONS

European Search Report, European Application No. 17197837.2, dated Mar. 15, 2018, European Patent Office; European Search Report 8 pages.
(Continued)

*Primary Examiner* — Craig Kim
*Assistant Examiner* — Katheryn A Malatek
(74) *Attorney, Agent, or Firm* — Cantor Colburn LLP

(57) ABSTRACT

Air mixing systems for gas turbine engines include a heat exchanger, a first extraction conduit fluidly coupled to an inlet of the heat exchanger, a second extraction conduit fluidly coupled to an outlet of the heat exchanger, an injection conduit fluidly coupled to the second extraction conduit, an onboard injector supply chamber fluidly coupled to the injection conduit, and an onboard injector fluidly coupled to the onboard injector supply chamber.

16 Claims, 13 Drawing Sheets

(51) Int. Cl.
*F01D 5/08* (2006.01)
*F02C 6/18* (2006.01)
*F23R 3/04* (2006.01)
*F01D 9/02* (2006.01)
*F02C 6/08* (2006.01)

(52) U.S. Cl.
CPC .......................... *F02C 6/08* (2013.01); *F02C 6/18* (2013.01); *F05D 2240/126* (2013.01); *F05D 2240/129* (2013.01); *F05D 2240/35* (2013.01); *F05D 2260/14* (2013.01); *F05D 2260/213* (2013.01); *F05D 2300/175* (2013.01); *F23R 3/04* (2013.01); *F23R 3/045* (2013.01); *Y02T 50/673* (2013.01); *Y02T 50/676* (2013.01)

(58) Field of Classification Search
CPC . F01D 9/02; F01D 5/081; F01D 5/082; F05D 2260/213
See application file for complete search history.

(56) References Cited

U.S. PATENT DOCUMENTS

| | | |
|---|---|---|
| 6,612,114 B1 | 9/2003 | Klingels |
| 2008/0141678 A1* | 6/2008 | Brunet ................... F01D 5/046 60/806 |
| 2011/0088405 A1* | 4/2011 | Turco ..................... F01D 5/081 60/782 |
| 2013/0078080 A1 | 3/2013 | Durocher et al. |
| 2013/0219920 A1 | 8/2013 | Suciu et al. |
| 2013/0255275 A1 | 10/2013 | Schwarz et al. |

OTHER PUBLICATIONS

European Search Report, European Application No. 16151950.9, dated Jun. 15, 2016; European Search Report 2 pages.

* cited by examiner

AIR MIXING SYSTEMS HAVING MIXING CHAMBERS FOR GAS TURBINE ENGINES

CROSS-REFERENCE TO RELATED APPLICATIONS

This application is a continuation-in-part application of the legally related U.S. Ser. No. 14/600,862 filed Jan. 20, 2015, the contents of which are incorporated by reference herein in their entirety.

FIELD OF INVENTION

The present disclosure relates to gas turbine engines, and, more specifically, to efficient air mixing system(s) including passages and/or mixing chambers and volumes distributed about a combustor section of the gas turbine engine.

BACKGROUND

Gas turbine engines often operate at high temperatures. Combustors and turbines in particular may be exposed to exceedingly harsh environments. As engine efficiency and power increases, internal temperatures continue to rise. As a result, gas turbine engines depend on cooling to protect components and ensure longevity. Cooling, however, often relies on gas extracted from the gas path that would otherwise translate to thrust. Thus, providing cooling while minimizing the use of compressed gas may increase engine efficiency.

SUMMARY

According to one embodiment, air mixing systems are provided. The air mixing systems include a heat exchanger, a first extraction conduit fluidly coupled to an inlet of the heat exchanger, a second extraction conduit fluidly coupled to an outlet of the heat exchanger, an injection conduit fluidly coupled to the second extraction conduit, an onboard injector supply chamber fluidly coupled to the injection conduit, and an onboard injector fluidly coupled to the onboard injector supply chamber.

In addition to one or more of the features described herein, or as an alternative, further embodiments of the air mixing systems may include at least one mixing aperture formed in a wall that defines the onboard injector supply chamber to enable warm air to enter the onboard injector supply chamber and mix with the cooled air.

In addition to one or more of the features described herein, or as an alternative, further embodiments of the air mixing systems may include a third extraction conduit fluidly coupled between the second extraction conduit and the injection conduit, wherein the third extraction conduit has a double walled architecture.

In addition to one or more of the features described herein, or as an alternative, further embodiments of the air mixing systems may include that the heat exchanger supplies cooled air to the second extraction conduit, further comprising at least one mixing aperture formed in the third extraction conduit to enable warm air to enter the third extraction conduit and mix with the cooled air.

In addition to one or more of the features described herein, or as an alternative, further embodiments of the air mixing systems may include at least one structural support within the onboard injector supply chamber configured to support at least one wall defining the onboard injector supply chamber.

In addition to one or more of the features described herein, or as an alternative, further embodiments of the air mixing systems may include that the at least one structural support extends from a turning vane of the onboard injector into the onboard injector supply chamber.

In addition to one or more of the features described herein, or as an alternative, further embodiments of the air mixing systems may include that the at least one structural support comprises a plurality of pedestals, columns, pillars, posts, struts formed within the onboard injector supply chamber.

In addition to one or more of the features described herein, or as an alternative, further embodiments of the air mixing systems may include that the at least one structural support fluidly separates the onboard injector supply chamber into at least two subchambers.

In addition to one or more of the features described herein, or as an alternative, further embodiments of the air mixing systems may include that the onboard injector supply chamber is formed from a plurality of tubes extending from the injection conduit to the onboard injector.

In addition to one or more of the features described herein, or as an alternative, further embodiments of the air mixing systems may include a header formed between the injection conduit and at least one of the plurality of tubes.

According to another embodiment, gas turbine engines are provided. The gas turbine engines include a compressor, a combustor in fluid communication with the compressor, a rotor disk having a plurality of blades in fluid communication with the combustor, an onboard injector configured to supply cooling air to the rotor disk, and an air mixing system. The air mixing system includes a heat exchanger, a first extraction conduit fluidly coupled to an inlet of the heat exchanger and fluidly coupled to an outer plenum surrounding the combustor, a second extraction conduit fluidly coupled to an outlet of the heat exchanger, an injection conduit fluidly coupled to the second extraction conduit, and an onboard injector supply chamber fluidly coupled to the injection conduit and the onboard injector.

In addition to one or more of the features described herein, or as an alternative, further embodiments of the gas turbine engines may include at least one mixing aperture formed in a wall that defines the onboard injector supply chamber to enable warm air to enter the onboard injector supply chamber from an inner plenum surrounding the combustor and mix with the cooled air within the onboard injector supply chamber.

In addition to one or more of the features described herein, or as an alternative, further embodiments of the gas turbine engines may include a third extraction conduit fluidly coupled between the second extraction conduit and the injection conduit, wherein the third extraction conduit has a double walled architecture and extends through a portion of a plenum surrounding the combustor.

In addition to one or more of the features described herein, or as an alternative, further embodiments of the gas turbine engines may include that the heat exchanger supplies cooled air to the second extraction conduit, further comprising at least one mixing aperture formed in a surface of the third extraction conduit to enable warm air to enter the third extraction conduit from the plenum surrounding the combustor and mix with the cooled air within the third extraction conduit.

In addition to one or more of the features described herein, or as an alternative, further embodiments of the gas turbine engines may include at least one structural support within the onboard injector supply chamber configured to support at least one wall defining the onboard injector supply chamber.

In addition to one or more of the features described herein, or as an alternative, further embodiments of the gas turbine engines may include that the at least one structural support extends from a turning vane of the onboard injector into the onboard injector supply chamber.

In addition to one or more of the features described herein, or as an alternative, further embodiments of the gas turbine engines may include that the at least one structural support comprises a plurality of pedestals, columns, pillars, posts, struts formed within the onboard injector supply chamber.

In addition to one or more of the features described herein, or as an alternative, further embodiments of the gas turbine engines may include that the at least one structural support fluidly separates the onboard injector supply chamber into at least two subchambers.

In addition to one or more of the features described herein, or as an alternative, further embodiments of the gas turbine engines may include that the onboard injector supply chamber is formed from a plurality of tubes extending from the injection conduit to the onboard injector.

In addition to one or more of the features described herein, or as an alternative, further embodiments of the gas turbine engines may include a header formed between the injection conduit and at least one of the plurality of tubes.

Technical effects of embodiments of the present disclosure include air mixing systems that precool and then mix such cooled air with air surrounding a combustor to provided conditioned, mixed air to an onboard injector and thus cool a rotor or blades of a gas turbine engine.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1A:
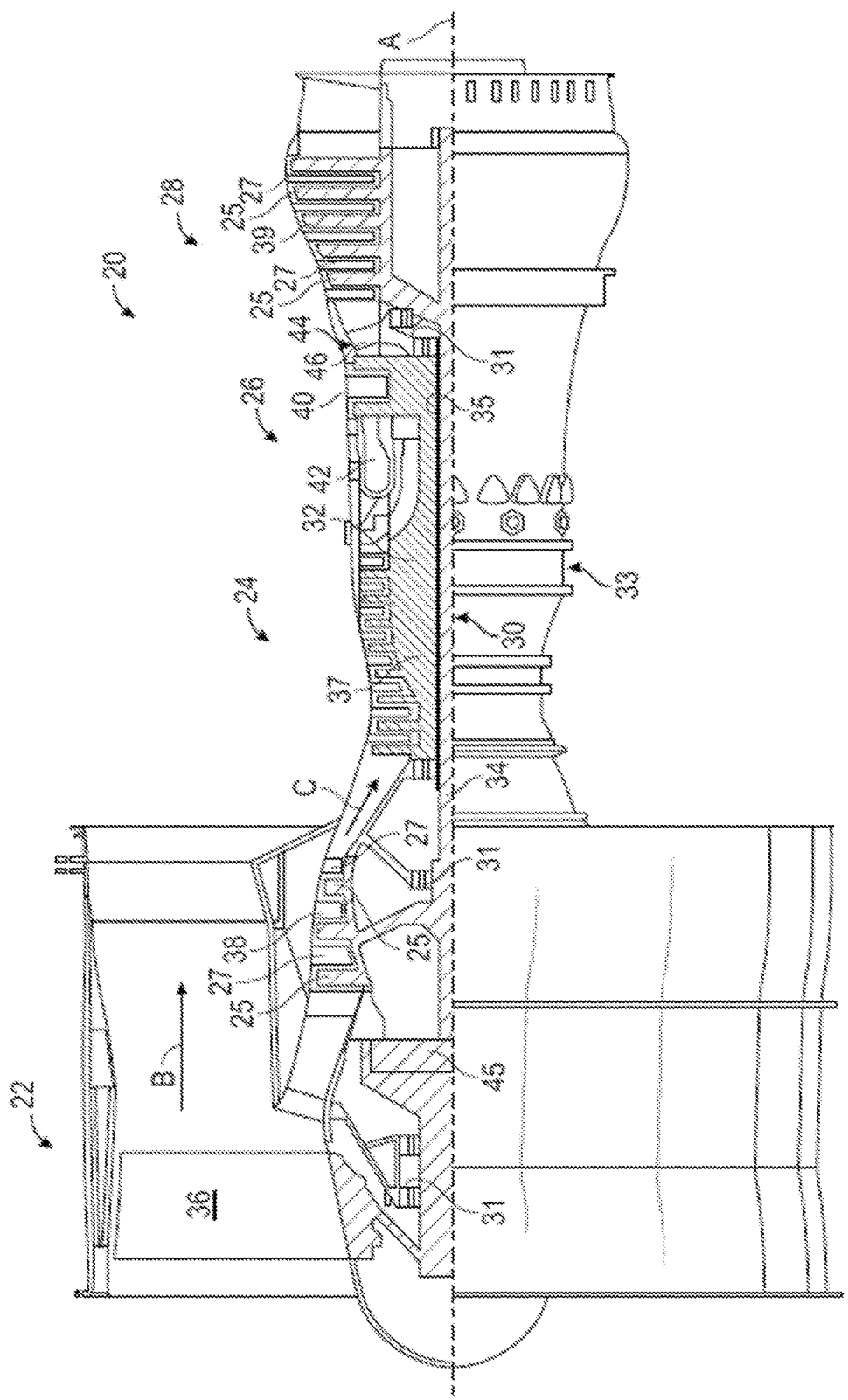
FIG. 1A is a schematic cross-sectional illustration of a gas turbine engine architecture that may employ various embodiments disclosed herein.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1A schematically illustrates a gas turbine engine 20. The exemplary gas turbine engine 20 is a two-spool turbofan engine that generally incorporates a fan section 22, a compressor section 24, a combustor section 26, and a turbine section 28. Alternative engines might include an augmenter section (not shown) among other systems for features. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies add or extract energy from the core airflow that is communicated through the gas turbine engine 20 along the core flow path C. The vanes 27 of the vane assemblies direct the core airflow to the blades 25 to either add or extract energy.

Various components of a gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits that include features such as airflow bleed ports are discussed herein.

Figure 1B:
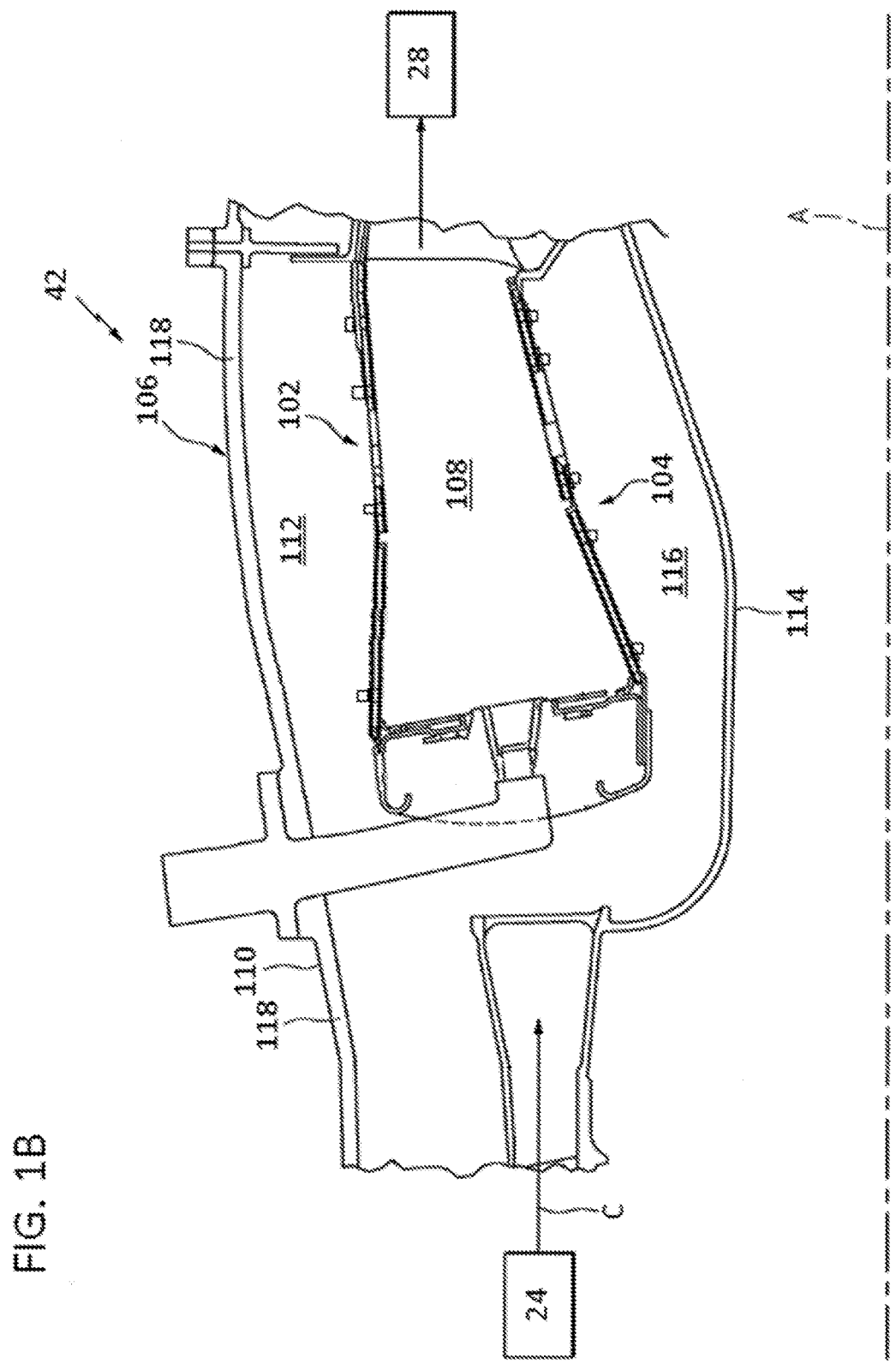
FIG. 1B is a schematic illustration of a combustor section of a gas turbine engine that may employ various embodiments disclosed herein.

With reference to FIG. 1B, an enlarged schematic illustration of the combustor 42 is shown. The combustor 42 can be annular and generally includes an outer wall 102, an inner wall 104 and a diffuser case module 106. The outer wall 102 and the inner wall 104 are spaced apart radially with respect to axis A and such that a combustion chamber 108 is generally defined there between. The combustion chamber 108 is generally annular in shape. The outer wall 102 is spaced radially inward from a diffuser outer case 110 of the diffuser case module 106, with an annular outer plenum 112 being defined there between. The inner wall 104 is spaced radially outward from a diffuser inner case 114 of the diffuser case module 106 to define an annular inner plenum 116. It should be understood that although a particular combustor configuration is illustrated, other combustor types with various combustor wall and case arrangements will also benefit here from. For instance, the diffuser outer case 110 maybe an integral part of an engine case structure 118.

Figure 2:
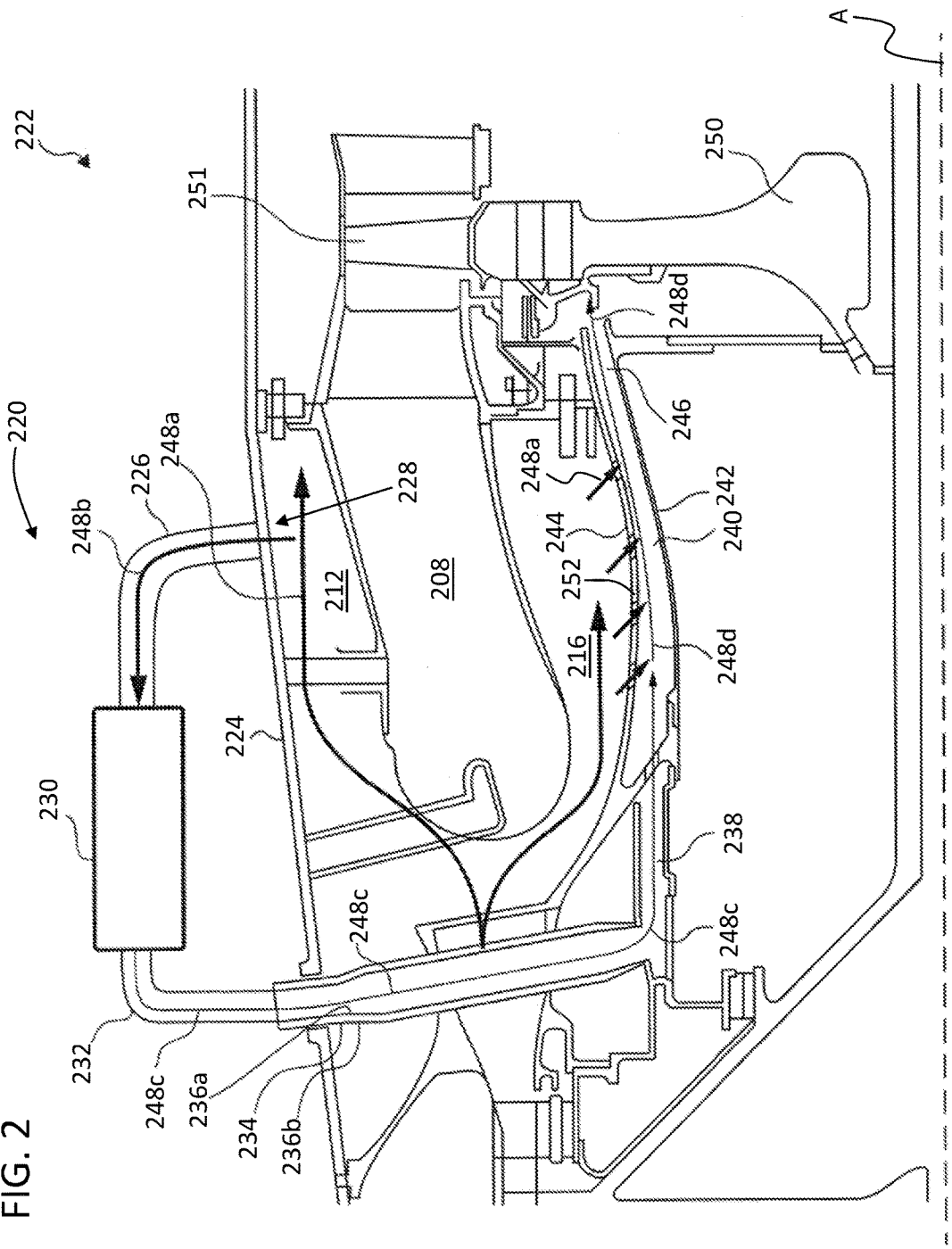
FIG. 2 illustrates a system for cooling turbine disks using air mixing and an onboard injector in accordance with an embodiment of the present disclosure.

Turning now to FIG. 2, a air mixing system 220 for use in a combustor section 222 of a gas turbine engine in accordance with an embodiment of the present disclosure is shown. The air mixing system 220 is configured relative to and with a diffuser case 224 of the gas turbine engine. A first extraction conduit 226 is configured to extract air or other coolant from a location within the diffuser case 224, such as, for example, from an outer plenum 212 that is exterior to a combustion chamber 208, as described above. The first extraction conduit 226, in some configurations, can be configured to extract 0.5 to 20 percent of air available in the outer plenum 212 through an extraction aperture 228.

The air mixing system 220 includes a heat exchanger 230 with an inlet fluidly and mechanically coupled to the conduit 226. An outlet of the heat exchanger 230, as shown, is fluidly and mechanically coupled to a second extraction conduit 232. The second extraction conduit 232 is fluidly and mechanically coupled to a third extraction conduit 234. The third extraction conduit 234, as schematically shown, includes a double-walled architecture to improve insulation characteristics, with an outer wall 236a disposed around inner wall 236b. In various embodiments, third extraction conduit 234 can be disposed within a strut providing support to bearings and static structures within a gas turbine engine. The third extraction conduit 234 may extend to and fluidly connect with an injection conduit 238. The extraction conduits 226, 232, 234 and the injection conduit 238 define a fluid flow path that guides air extracted from the outer plenum 212 (e.g., cooling air) through the air mixing system 220 without exposing the air directly to hot air within the diffuser case 224 (e.g., hot air surrounding and/or within the combustion chamber 208). Injection conduit 238, as shown, extends axially (i.e., along the engine axis A) toward an onboard injector supply chamber 240. Injection conduit 238 may be mechanically and fluidly coupled with the onboard injector supply chamber 240. Onboard injector supply chamber 240, as shown, is defined by an inner diameter wall 242 and an outer diameter wall 244. The outer diameter wall 244 of the onboard injector supply chamber 240 may be the same structure as the diffuser inner case 114 shown in FIG. 1B. Thus, the onboard injector supply chamber 240 is positioned radially inward from the combustion chamber 208 and an annular inner plenum 216. The onboard injector supply chamber 240 is coupled to or is structurally part of an onboard injector 246. The term "onboard injector," as used herein, includes, but is not limited to tangential onboard injectors, compressor onboard injectors, cavity onboard injectors, and radial onboard injectors. The illustrations provided herein are shown with respect to a tangential onboard injector, but those of skill in the art will appreciate that embodiments of the present disclosure can be applied to any type of onboard injector, and thus the present disclosure is not limited to any particular onboard injector type or configuration.

In various embodiments, air mixing system 220 may extract diffuser air 248a from the outer plenum 212 within the diffuser case 224 through the extraction aperture 228. Extracted air 248b flows through the first extraction conduit 226 and into the heat exchanger 230 to cool the extracted air 248b. Cooled air 248c exits the heat exchanger 230 and flows through the second extraction conduit 232, the third extraction conduit 234, the injection conduit 238, and into the onboard injector supply chamber 240. The cooled air 248c is mixed within the onboard injector supply chamber 240 to form mixed air 248d that is delivered through the onboard injector 246 to a turbine disk 250 and/or a blade 251 for cooling purposes.

The diffuser air 248a available and extracted from the outer plenum 212 within the diffuser case 224 may be approximately 1,500° F. (816° C.) during operation of the gas turbine engine. The first extraction conduit 226 can be used to deliver the hot diffuser air 248a into an inlet of the heat exchanger 230. The heat exchanger 230 can be placed in or otherwise configured with a cooling medium, e.g., a relatively cooler air stream from fan 36 shown in FIG. 1A. As a result, the heat exchanger 230 can be used to reduce the temperature of the extracted air 248b to as low as approximately 450° F. (232° C.). The cooled air 248c exits through an outlet of the heat exchanger 230 via the second extraction conduit 232 and is delivered into the third extraction conduit 234. In various embodiments, the heat exchanger 230 can be an air-to-air heat exchanger that is fluidly connected to an air flow path within the gas turbine engine. In other embodiments, a cooling medium (e.g., liquid) can be self-contained within the heat exchanger 230 to cool the extracted air 248b.

The third extraction conduit 234 directs the cooled air 248c to the injection conduit 238. As illustrated, as the cooled air 248c passes through the third extraction conduit 234, the cooled air 248c passes through a portion of the diffuser case 224 with limited heating due to the dual-walled architecture of the third extraction conduit 234. The cooled air 248c then passes through the injection conduit 238 and into the onboard injector supply chamber 240. The onboard injector supply chamber 240 is configured to enable mixing of the cooled air 248c and diffuser air 248a to produce mixed air 248d. That is, the cooled air 248c that is sourced from the diffuser air 248a can be mixed with additional diffuser air 248a after cooling to achieve a desired air temperature. The diffuser air 248a enters the onboard injector supply chamber 240 through mixing chamber apertures 252 formed within the outer diameter wall 244 of the onboard injector supply chamber 240 (or, stated another way, mixing chamber apertures 252 formed in diffuser inner case 114 shown in FIG. 1B).

The mixing chamber apertures of the present disclosure can be intentionally formed within a structure or may be a fluid path that exists in a structure (e.g., leakage apertures or fluid paths). Accordingly, the mixing chamber apertures are not limited to specific configurations and/or shapes, but rather refer to fluid passages that enable air to enter into a mixing chamber. In some non-limiting embodiments, the mixing chamber apertures can be structured as intentional or purposeful leakage. Leakage can be achieved purposefully, for example, through the fact that the mixing chamber (or various conduits of embodiments described herein) can expand and/or contract at different rates than a case through which is passes, thus allowing leakage for outside the chamber but within the case to enter into the chamber.

The mixing chamber apertures 252 can be configured to extract diffuser air 248a from the inner plenum 216 to be mixed with the cooled air 248c within the onboard injector supply chamber 240. The mixed air 248d can then be supplied to the onboard injector 246. The onboard injector 246 accelerates the mixed air 248d and expels the mixed air 248d toward the disk 250 to cool the disk 250 and/or the blade 251. In some embodiments, the mixing chamber apertures 252 can be configured to enable a specific or predefined amount of air to enter into the mixing chamber or onboard injector supply chamber. For example, the number, geometry, angle, and location of the mixing chamber apertures can be selected to enable at least 2% by volume of the total flow through the mixing chamber or onboard injector supply chamber to enter through the mixing chamber apertures. That is, in some embodiments, 2% of the mixed air 248d can be sourced from the inner plenum 216. Or stated another way, at least 2% of the mixed air can be uncooled or untreated air, and the remaining portion is cooled or treated air that is sourced from the heat exchanger.

The above described example embodiment is not to be limiting. That is, depending on the operational needs and/or structural features and/or limitations of a system, different preselected percentages of uncooled air can be supplied for mixing, which can be controlled by the shape, size, location, etc. of the mixing chamber apertures. For example, in other non-limiting embodiments, air mixed in the mixing chamber can be predetermined or configured to have a mass flow that is greater by 5%, 10%, 20% or other percentage of the flow that passes through the heat exchanger.

The onboard injector supply chamber 240 can take various configurations and can include various types of structures, either aerodynamic or structural. The onboard injector supply chamber 240 can be annular or semi-annular about the engine axis A, can be segmented, chambered, tubular, or can take other geometric shapes and/or configurations to achieve desired mixing of air within the onboard injector supply chamber 240 and supply such mixed air into and through the onboard injector 246. Various non-limiting example configurations of the onboard injector supply chamber in accordance with the present disclosure are shown and described herein.

In some embodiments, the mixing of the air can occur in or at other locations along the flow path from the extraction aperture 228 to the onboard injector 246. That is, the mixing is not limited to occur within the onboard injector supply chamber 240 shown in FIG. 2. For example, in some embodiments, the third extraction conduit 234 can be configured with the mixing apertures 252 and the mixing of the cooled air 248c with the hot diffuser air 248a can occur within the double-walled conduit. The mixed air 248d would then flow into the injection conduit 238, into the onboard injector supply chamber 240, and into the onboard injector 246 for supply to the disk 250 and/or blade 251. Although shown herein as a double-walled conduit, those of skill in the art will appreciate that any wall structure can be used without departing from the scope of the present disclosure, such, as for example, a triple-walled structure.

Figure 3A:
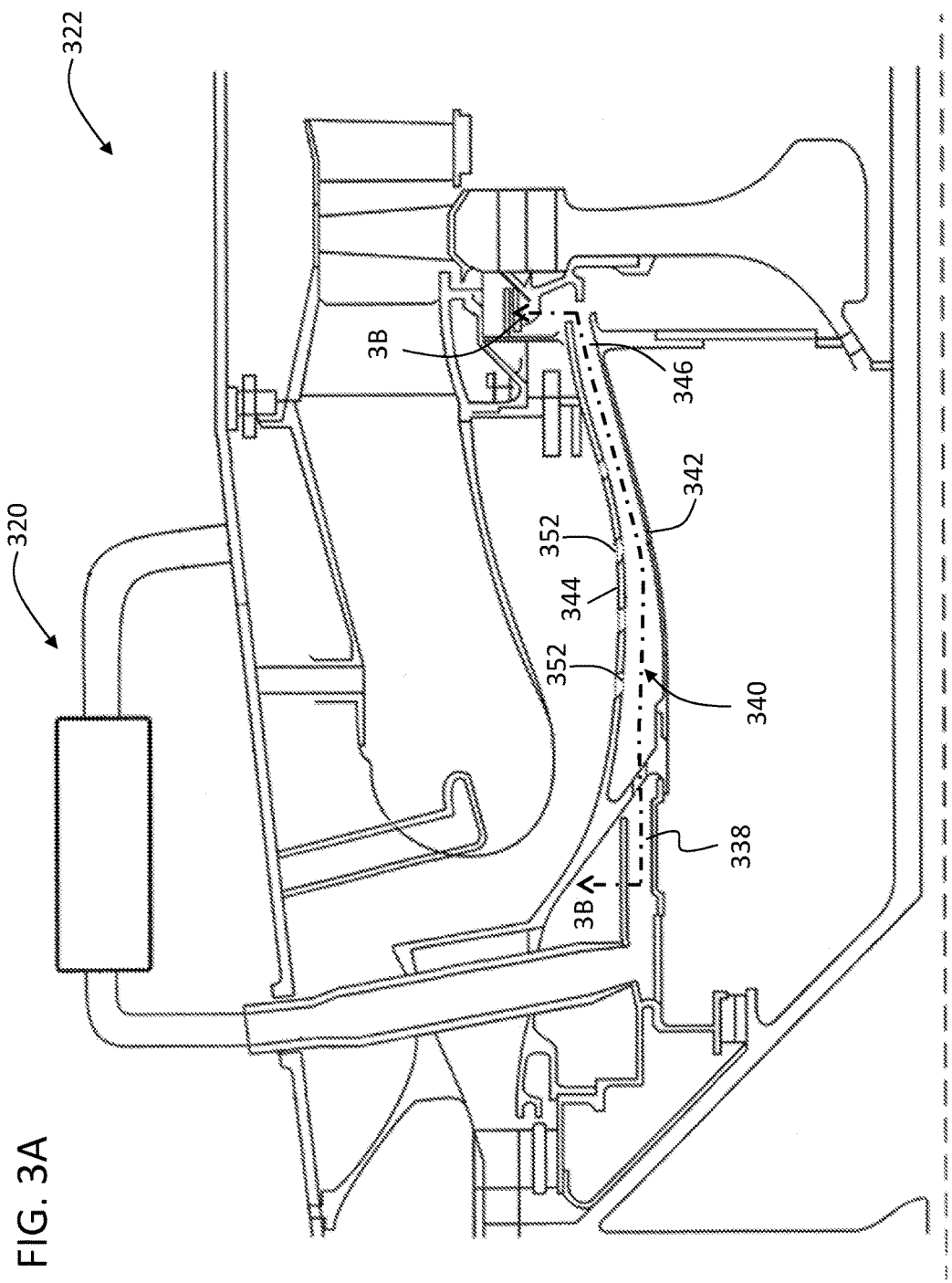
FIG. 3A illustrates a combustor section of a gas turbine engine having an air mixing system in accordance with an embodiment of the present disclosure.
Figure 3B:
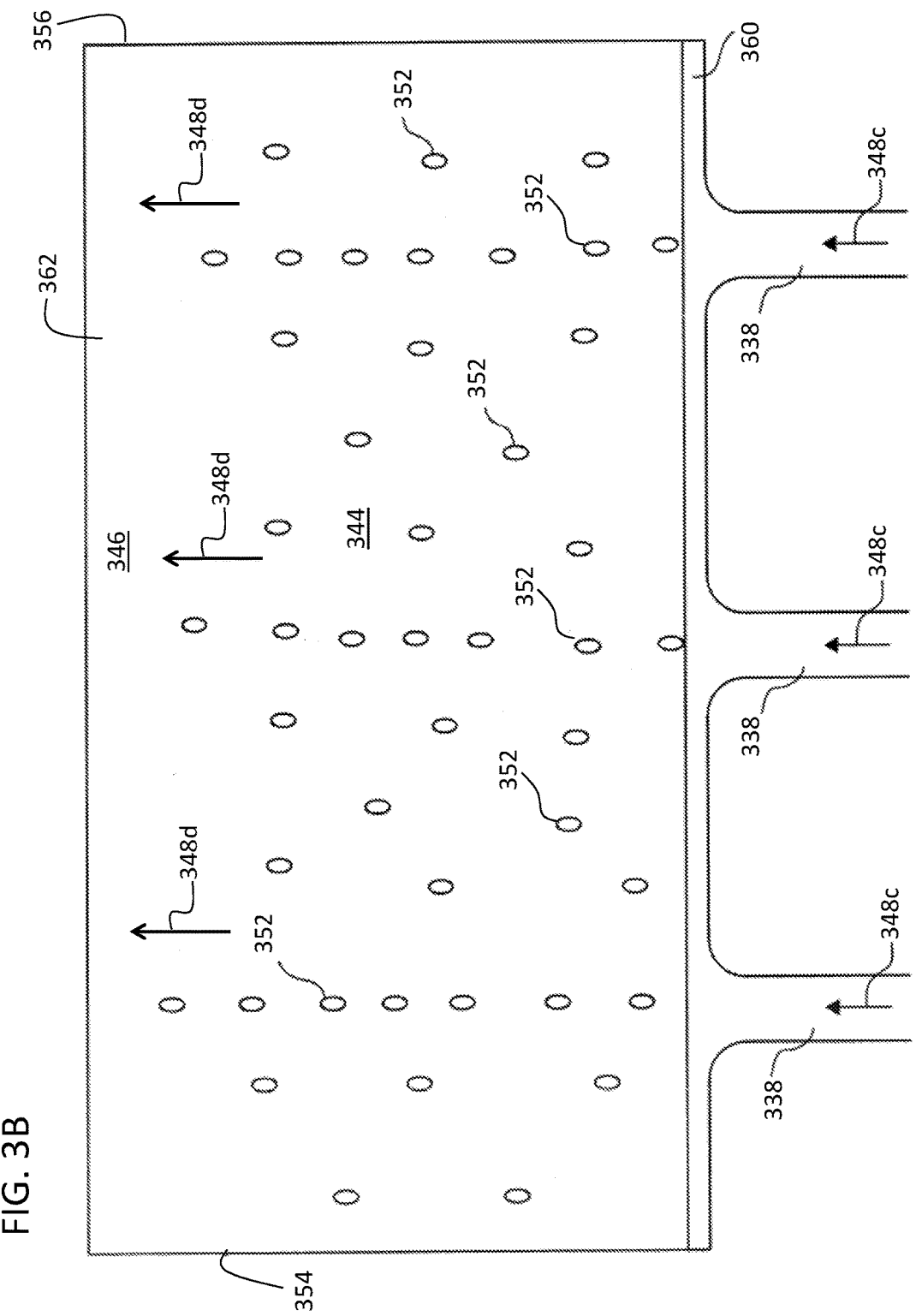
FIG. 3B illustrates a partial-sectional view of a portion of the air mixing system of FIG. 3A as viewed along the line 3B-3B.

Turning now to FIGS. 3A-3B, an air mixing system 320 for use in a combustor section 322 of a gas turbine engine in accordance with an embodiment of the present disclosure is shown. The combustor section 322 and air mixing system 320 are configured similar to that shown and described with respect to FIG. 2, and thus, for simplicity, similar features will not be described again. The air mixing system 320 includes a plurality of extraction conduits and a heat exchanger that are configured to supply conditioned air into an onboard injector supply chamber 340 for mixing. FIG. 3A is a side cross-sectional view of the combustor section 322 and FIG. 3B is a partial sectional view as viewed along the dashed line 3B-3B.

As shown in FIGS. 3A-3B, a plurality of mixing chamber apertures 352 can be formed in an outer diameter wall 344 of the onboard injector supply chamber 340, which may be a similar structure as the diffuser inner case 114 shown in FIG. 1B. The outer diameter wall 344 of FIG. 3A is shown flattened out to illustrate mixing chamber apertures 352 formed therein. The injection conduits 338 can be configured in an annular geometry with first side 356 and second side 358 joined (e.g., the outer diameter wall 344 is a single sheet of material). An inner diameter wall 342 that defines part of the onboard injector supply chamber 340 can have a similar configured, but may not include the mixing apertures. In other embodiments, the inner and/or outer diameter walls 342, 344 can be formed from multiple joined sheets of material.

The onboard injector supply chamber 340 is defined between the inner diameter wall 342 and the outer diameter wall 344. Further, the onboard injector supply chamber 340 is fluidly connected to injection conduits 338 at a forward end 360 and fluidly connected to an onboard injector 346 at an aft end 362 of the onboard injector supply chamber 340.

As shown, the outer diameter wall 344 may meet a plurality of injection conduits 338 and include a plurality of mixing chamber apertures 352 to deliver mixed air 348d to the onboard injector 346. In non-limiting examples, two to ten injection conduits 338 may deliver cooled/conditioned air 348c into the onboard injector supply chamber 340. As shown, the mixing chamber apertures 352 may be more concentrated near injection conduits 338 and less concentrated further from injection conduits 338. The concentrations of mixing chamber apertures 352 may be optimized to provide a desired amount of mixed air 348d to the onboard injector 346.

As shown in the embodiment of FIGS. 3A-3B, the onboard injector supply chamber 340 does not include any internal structure. That is, in such embodiment, the inner diameter wall 342 and the outer diameter wall 344 can be supported from the exterior of the onboard injector supply chamber 340. Accordingly, in such configuration, the onboard injector supply chamber 340 may be substantially annular in shape/geometry between the injection conduits 338 and the onboard injector 346. However, such annular configuration is not to be limiting. In other embodiments, the onboard injector supply chamber and/or other aspects of the air mixing systems can include segmented, partitioned, or other structure, internal to or external to the onboard injector supply chamber. Further, although the mixing chamber apertures 352 are shown as circular or oval, those of skill in the art will appreciate that other shapes or geometries can be used without departing from the scope of the present disclosure. For example, the mixing chamber apertures can be slots, angular openings, tapered openings (either axially or radially with respect to an engine axis), etc.

For example, turning now to FIGS. 4-10, various example configurations of aspects of air mixing systems in accordance with embodiments of the present disclosure are schematically shown. The illustrations of FIGS. 4-10 provide similar partial section views within a combustor section of a gas turbine engine as that shown in FIG. 3B.

Figure 4:
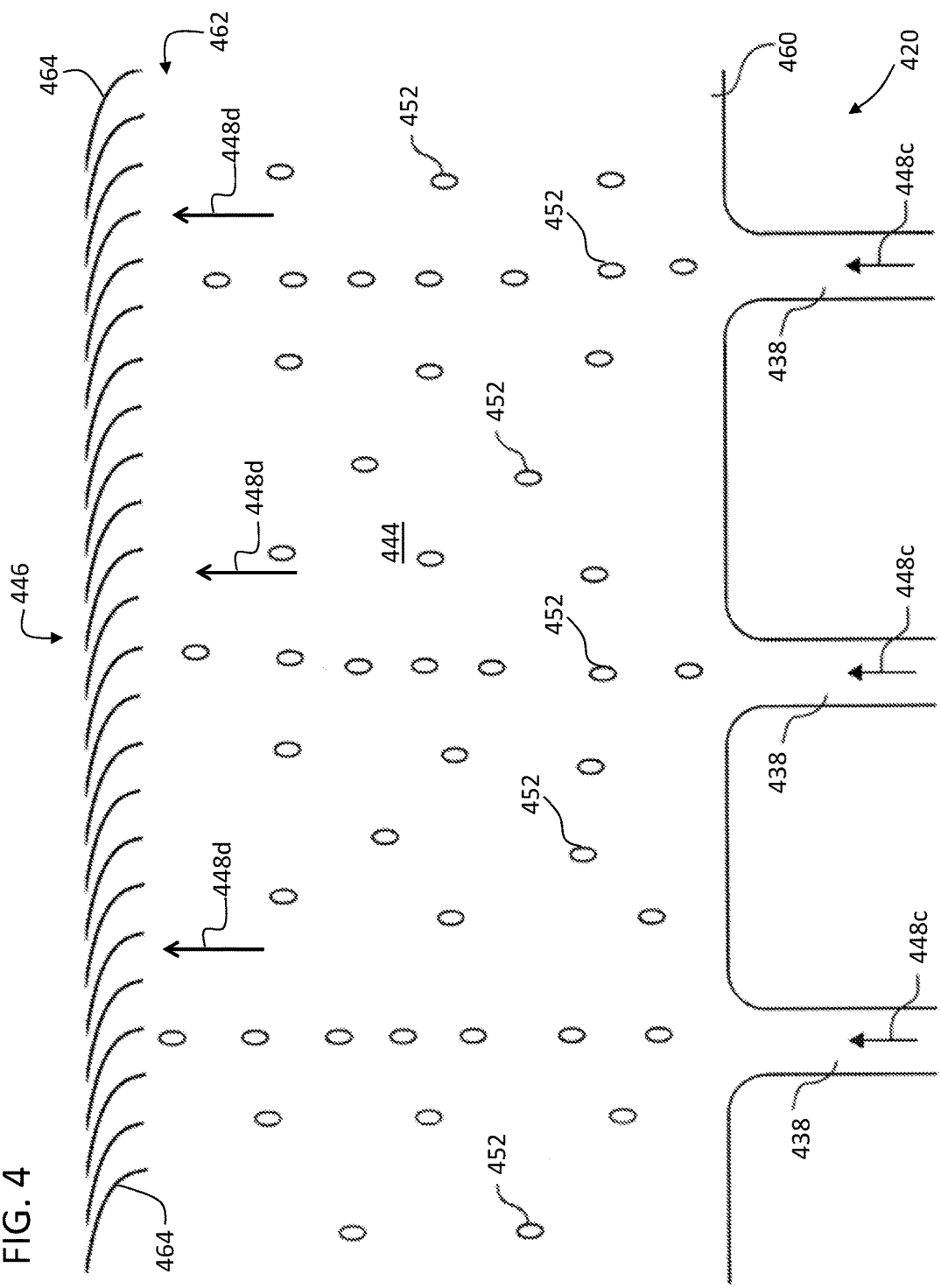
FIG. 4 is a schematic illustration of an air mixing system in accordance with another embodiment of the present disclosure.

As shown in FIG. 4, an air mixing system 420 is similar to that shown in FIGS. 3A-3B. An outer diameter wall 444 includes a plurality of mixing chamber apertures 452 formed therein. Cooled or conditioned air 448c is supplied through one or more injection conduits 438 at a forward end 460 of the outer diameter wall 444. The cooled air 448c can be mixed with air that enters the onboard injector supply chamber through the mixing chamber apertures 452 to generate mixed air 448d. The mixed air 448d then enters an onboard injector 446 at an aft end 462 of the onboard injector supply chamber (e.g., at the aft end 462 of the outer diameter wall 444). As shown in FIG. 4, the onboard injector 446 includes a plurality of turning vanes 464 that are configured to turn and condense the mixed air 448d such that the mixed air 448d is turned and accelerated to be injected toward a disk and/or blades of a gas turbine engine, as will be appreciated by those of skill in the art. In such a configuration, the turning vanes 464 can be used to structurally support one or both of an outer diameter wall 444 or an inner diameter wall that define the onboard injector supply chamber. That is, in such an embodiment, the structure that defines the onboard injector supply chamber may be formed internal to and/or within the onboard injector supply chamber.

Figure 5:
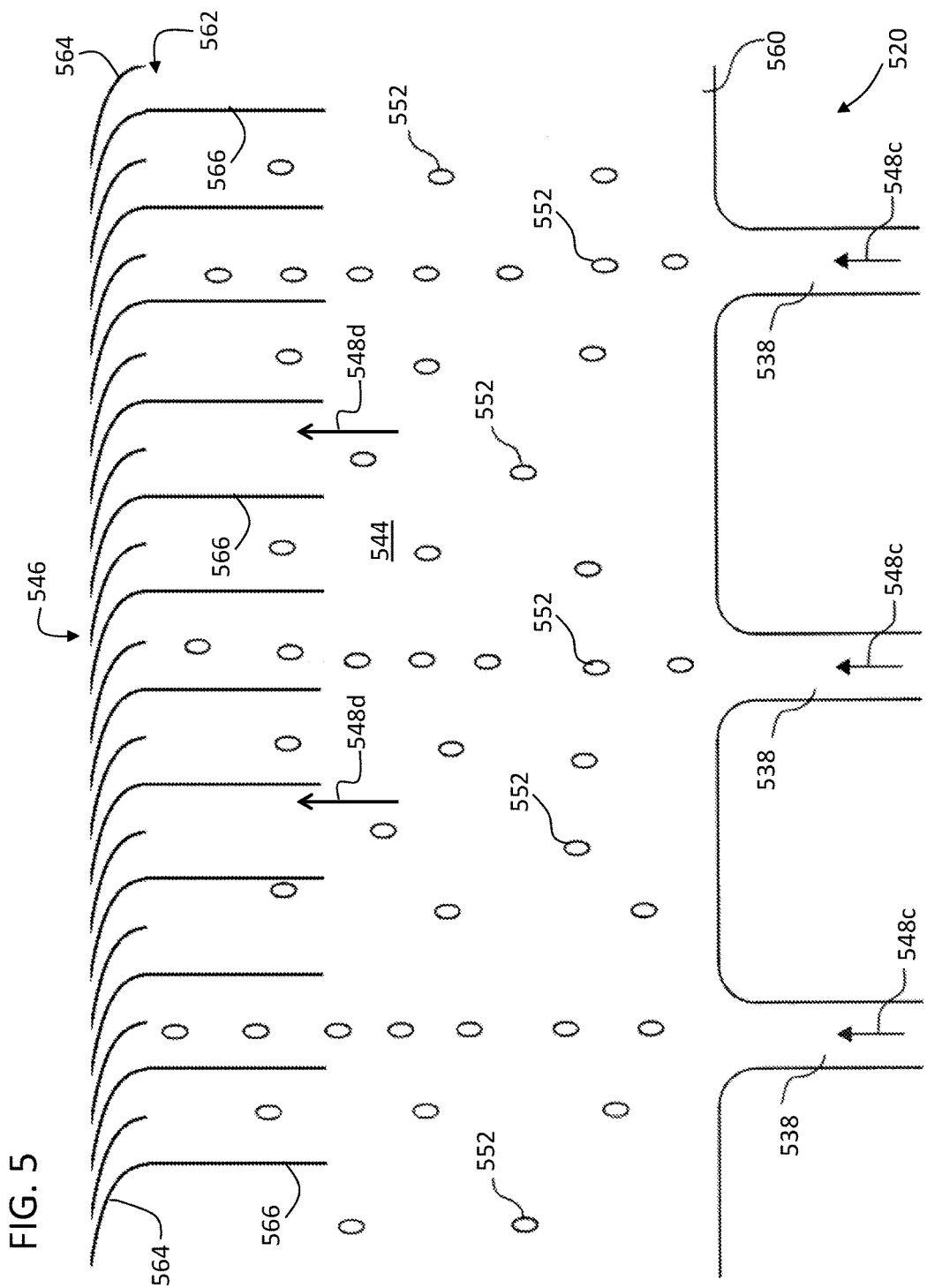
FIG. 5 is a schematic illustration of an air mixing system in accordance with another embodiment of the present disclosure.

As illustrated in FIG. 5, a similar configuration as that shown in FIG. 4 is provided. In FIG. 5, an air mixing system 520 is shown with additional structural support to the structure of the onboard injector supply chamber. An outer diameter wall 544 includes a plurality of mixing chamber apertures 552 formed therein. Cooled or conditioned air 548c is supplied through one or more injection conduits 538 at a forward end 560 of the outer diameter wall 544. The cooled air 548c can be mixed with air that enters the onboard injector supply chamber through the mixing chamber apertures 552 to generate mixed air 548d. The mixed air 548d then enters an onboard injector 546 at an aft end 562 of the onboard injector supply chamber (e.g., at the aft end 562 of the outer diameter wall 544). As shown in FIG. 5, the onboard injector 546 includes a plurality of turning vanes 564 as described above. In this configuration, one or more structural supports 566 can extend into the onboard injector supply chamber from one or more of the turning vanes 564 (i.e., forward along the outer diameter wall 544). The structural supports 566 can be formed within the onboard injector supply chamber and provide structural support to the inner and outer diameter walls that define the onboard injector supply chamber. Although shown such that two circumferentially adjacent structural supports 566 supplies mixed air 548d to two adjacent channels through the turning vanes 564, those of skill in the art will appreciate that each turning vane 564 can have a structural support 566 extending therefrom, or fewer of the turning vanes 564 than that shown in FIG. 5 can include structural supports 566. As shown in FIG. 5, the structural supports 566 extend partially into the onboard injector supply chamber and do not extend all the way to the forward end 560 of the outer diameter wall 544. However, such feature is not to be limiting.

Figure 6:
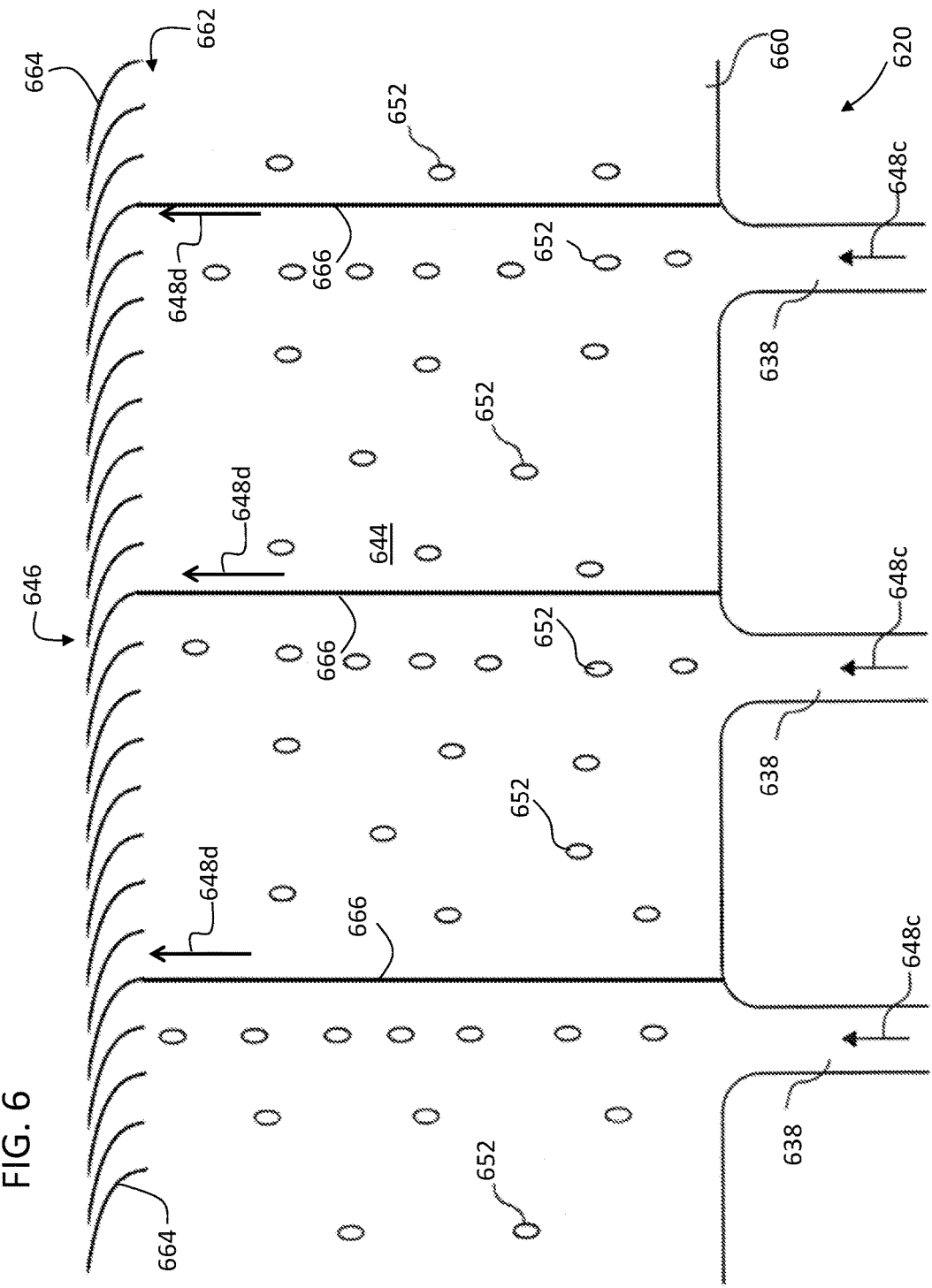
FIG. 6 is a schematic illustration of an air mixing system in accordance with another embodiment of the present disclosure.

For example, turning now to FIG. 6, a similar configuration as that shown in FIG. 5 is provided. In FIG. 6, an air mixing system 620 is shown with structural supports 666 extending the full axial length of the onboard injector supply chamber. An outer diameter wall 644 includes a plurality of mixing chamber apertures 652 formed therein. Cooled or conditioned air 648c is supplied through one or more injection conduits 638 at a forward end 660 of the outer diameter wall 644. The cooled air 648c can be mixed with air that enters the onboard injector supply chamber through the mixing chamber apertures 652 to generate mixed air 648d. The mixed air 648d then enters an onboard injector 646 at an aft end 662 of the onboard injector supply chamber (e.g., at the aft end 662 of the outer diameter wall 644). The onboard injector 646 includes a plurality of turning vanes 664 as described above. In this configuration, one or more structural supports 666 extend axially from the turning vanes 664 to the forward end 660 of the outer diameter wall 644. The structural supports 666 are formed within the onboard injector supply chamber and provide structural support to the inner and outer diameter walls that define the onboard injector supply chamber. In this embodiment, the structural supports 666 also divide the onboard injector supply chamber into different subchambers or segments. As shown, each injection conduit 638 supplies cooled air 648c into a different subchamber of the air mixing system 620. Such configuration is not to be limiting. For example, in some embodiments, the subchamber can be provided with cooled air from multiple injection conduits. In other embodiments, the structural supports 666 can terminate at a forward end such that the structural support 666 divides an airflow from a single injection conduit 638 into multiple subchambers.

Figure 7:
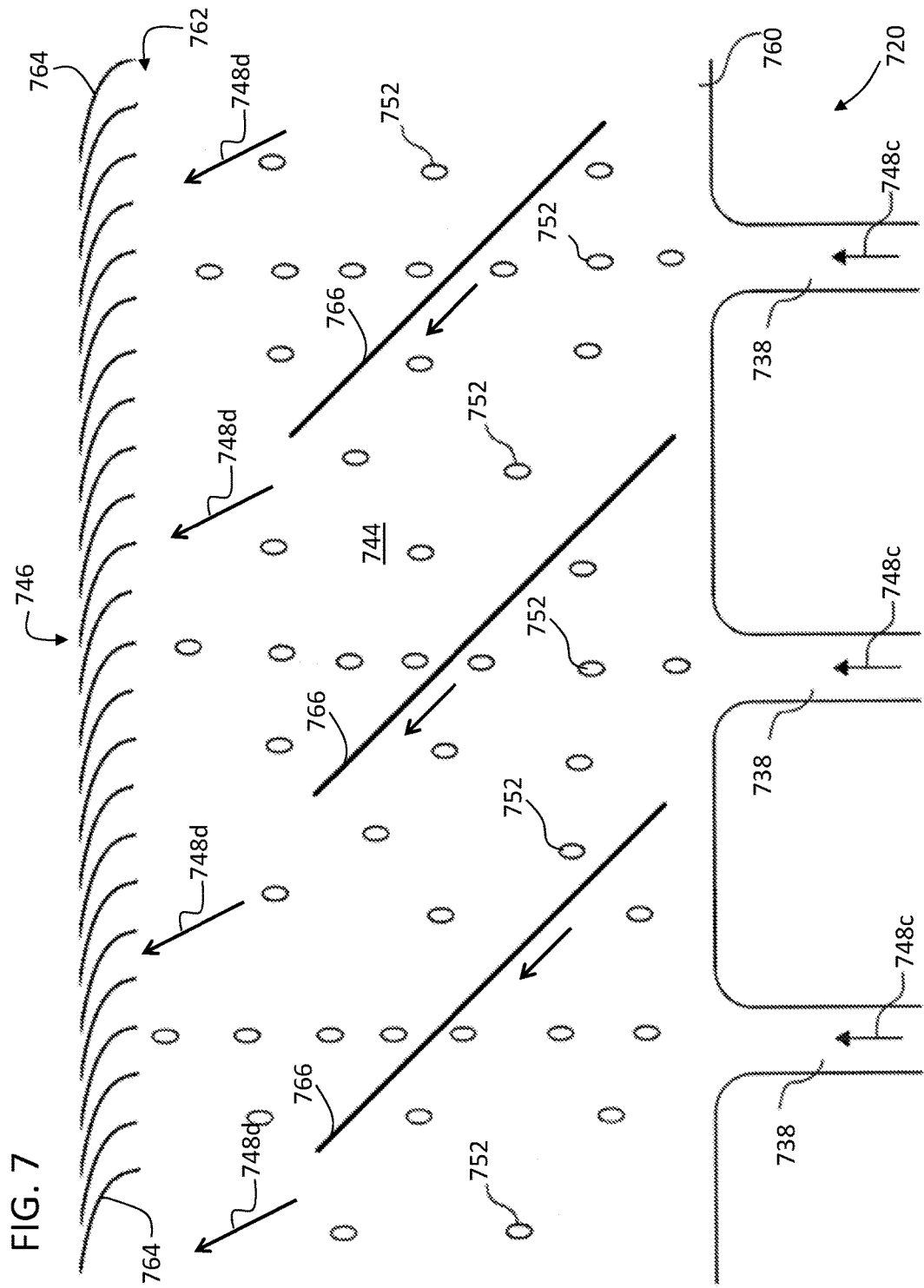
FIG. 7 is a schematic illustration of an air mixing system in accordance with another embodiment of the present disclosure.

Turning now to FIG. 7, an air mixing system 720 is shown with structural supports 766 angled relative to a direction of air injection from injection conduits 738. As shown, an outer diameter wall 744 includes a plurality of mixing chamber apertures 752 formed therein. Cooled or conditioned air 748c is supplied through the injection conduits 738 at a forward end 760 of the outer diameter wall 744. The cooled air 748c is mixed with air that enters the onboard injector supply chamber through the mixing chamber apertures 752 to generate mixed air 748d. The mixed air 748d then enters an onboard injector 746 at an aft end 762 of the onboard injector supply chamber (e.g., at the aft end 762 of the outer diameter wall 744). The onboard injector 746 includes a plurality of turning vanes 764 as described above. In this configuration, the one or more structural supports 766 are not connected to either the turning vanes 764 or the forward end of the onboard injector supply chamber. That is, the structural supports 766 are formed exclusively within the onboard injector supply chamber and provide structural support to the inner and outer diameter walls that define the onboard injector supply chamber. In this embodiment, the structural supports 766 are angled such that the structural supports 766 can turn or direct the cool air 738 and/or the mixed air 748d toward the onboard injector 746. As such, in addition to structural support, the structural supports 766 can provide aerodynamic control over air flowing through the onboard injector supply chamber.

Figure 8:
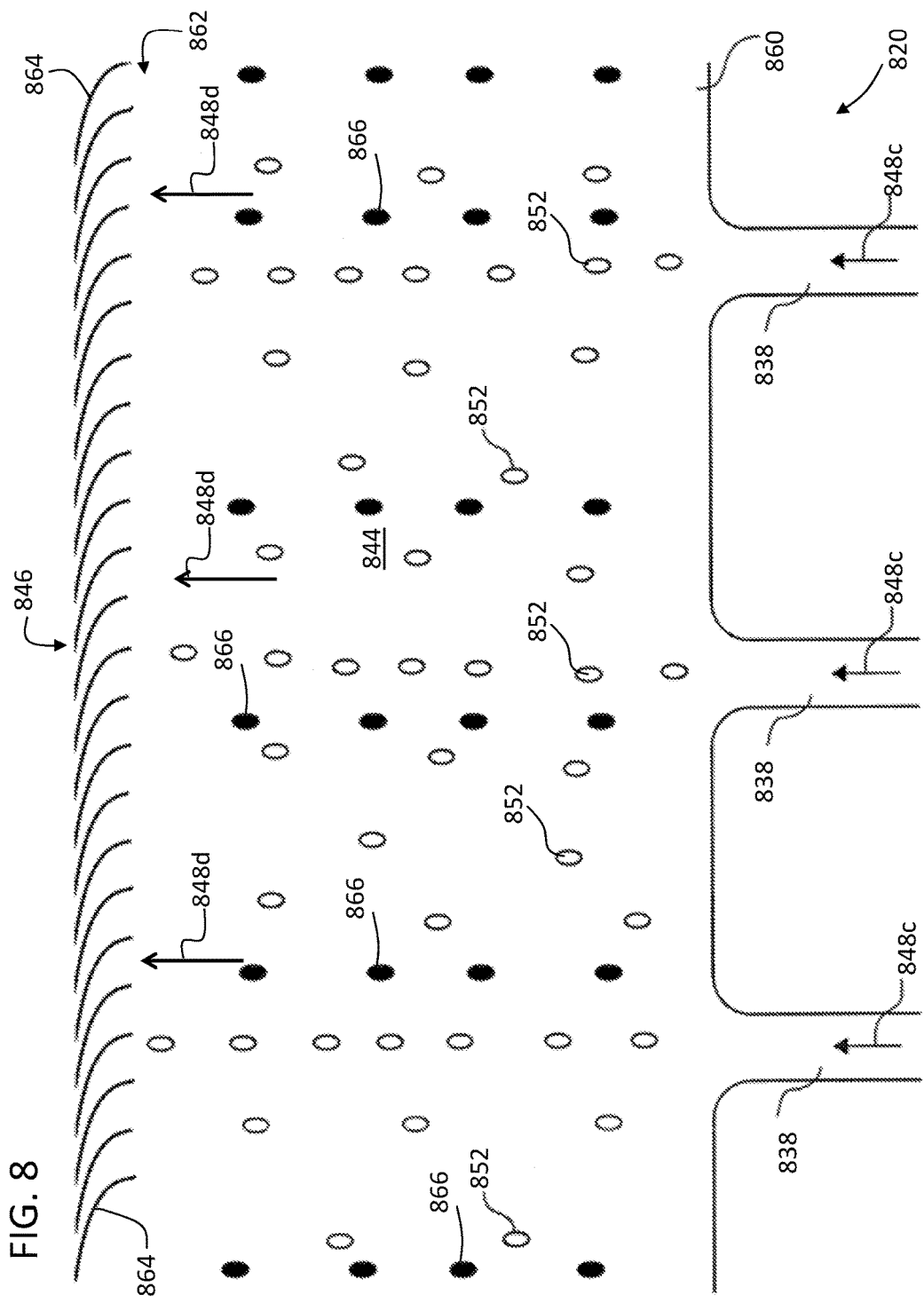
FIG. 8 is a schematic illustration of an air mixing system in accordance with another embodiment of the present disclosure.

Turning now to FIG. 8, an air mixing system 820 is shown with structural supports 866 in the form of pedestals, columns, pillars, posts, struts, etc. As shown, an outer diameter wall 844 includes a plurality of mixing chamber apertures 852 formed therein. Cooled or conditioned air 848c is supplied through the injection conduits 838 at a forward end 860 of the outer diameter wall 844. The cooled air 848c is mixed with air that enters the onboard injector supply chamber through the mixing chamber apertures 852 to generate mixed air 848d. The mixed air 848d then enters an onboard injector 846 at an aft end 862 of the onboard injector supply chamber (e.g., at the aft end 862 of the outer diameter wall 844). The onboard injector 846 includes a plurality of turning vanes 864 as described above. In this configuration, the structural supports 866 are not connected to either the turning vanes 864 or the forward end of the onboard injector supply chamber but rather are distributed throughout and within the onboard injector supply chamber to provide structural support to the inner and outer diameter walls that define the onboard injector supply chamber. In this embodiment, the structural supports 866 may not substantially impact the airflow that passes through the onboard injector supply chamber. However, in some embodiments, the structural supports 866 shown in FIG. 8 can be formed with aerodynamic characteristics to improve air mixing, airflow toward the onboard injector 846, or otherwise configured as desired.

In the embodiments described above, the onboard injector supply chamber has been generally annular and continuous or substantially continuous circumferentially about an engine axis (e.g., formed from two walls that define the interior onboard injector supply chamber). However, embodiments of the present are not so limited. For example, turning to FIGS. 9-10, alternative configurations of the onboard injector supply chamber in accordance with different embodiments are shown.

Figure 9:
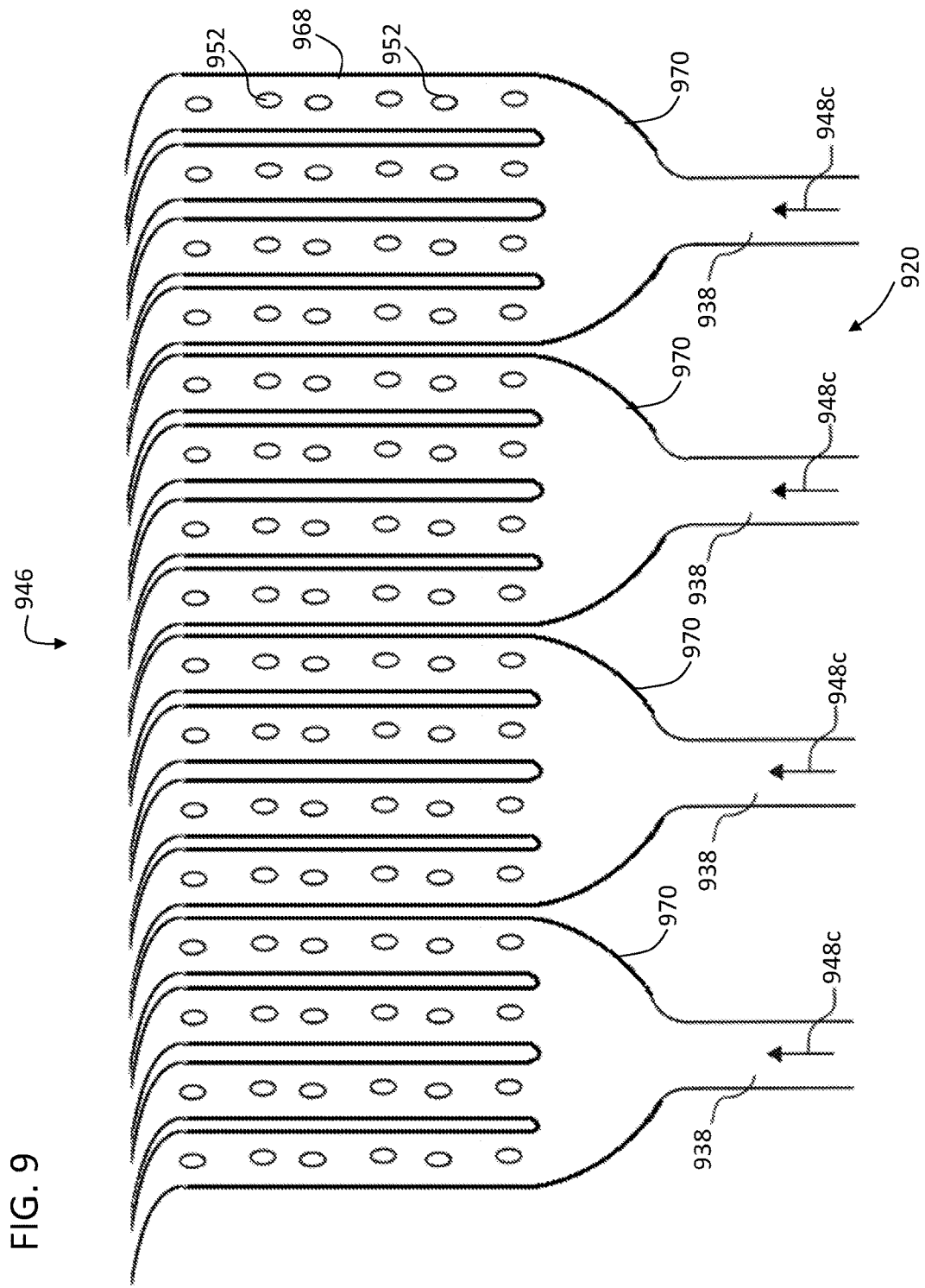
FIG. 9 is a schematic illustration of an air mixing system in accordance with another embodiment of the present disclosure.
Figure 10:
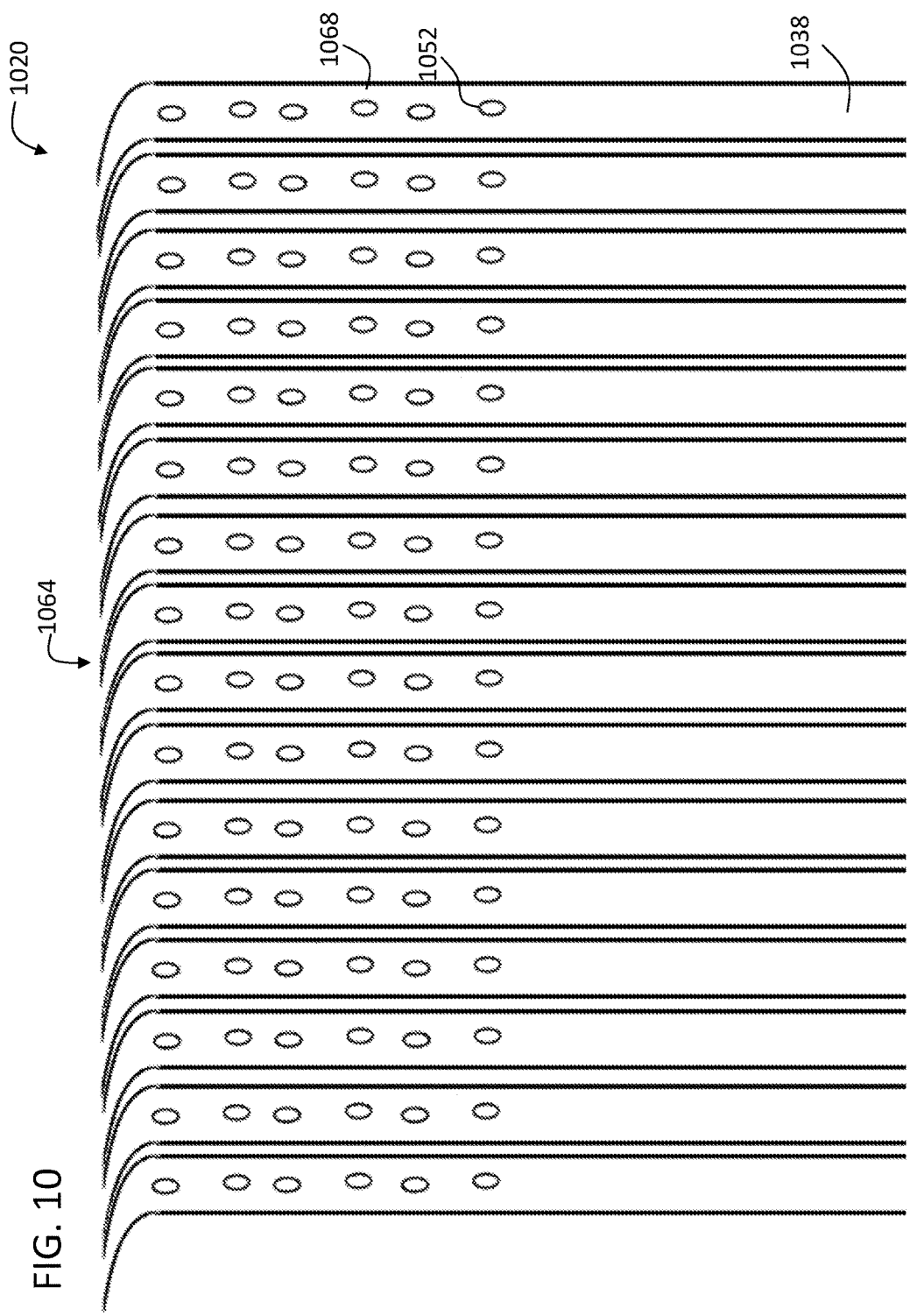
FIG. 10 is a schematic illustration of an air mixing system in accordance with another embodiment of the present disclosure.

The air mixing systems 920, 1020 of FIGS. 9-10 are similar to that described above, and thus similar features and aspects will not be shown or described again. In the embodiment of FIG. 9, a plurality of tubes 968 can be formed that extend from a header 970. Cooled air 948c can flow through an injection conduit 938 and into the header 970. The cooled air will then flow from the header 970 into the tubes 968. Each of the tubes 968 can include one or more mixing apertures 952 to enable mixing of the cooled air 948b with air from a combustor section of a gas turbine engine, such as shown and described above. In such an embodiment, the tubes may form a ring of tubes within the gas turbine engine, when viewed from the aft end of the engine. Each of the tubes 968 can end in one or more sections of an onboard injector 946. As shown, each tube 968 supplies mixed air to a single flow channel of the onboard injector 946. However, in other embodiments, one tube 968 can be configured to supply mixed air to multiple channels of the onboard injector 946, or multiple tubes 968 can be configured to supply mixed air to a common or single flow channel of the onboard injector 946. In this configuration, the air mixing chamber includes the header 970 and the tubes 968, and thus a separated or divided air mixing chamber is formed.

Turning now to FIG. 10, air mixing system 1020 comprises a plurality of tubes 1068 that extend directly from a single, respective injection conduit 1038. That is, the injection conduit 1038 can extend directly to a channel of an onboard injector 1064 and each of the tubes 1068 can include one or more mixing apertures 1052. In this embodiment, the air mixing chamber is formed collectively from the injection conduits 1038, the tubes 1068, and aspects of the onboard injector 1064. Turning now to FIGS. 3A-3B, an air mixing system 320 for use in a combustor section 322 of a gas turbine engine in accordance with an embodiment of the present disclosure is shown. The combustor section 322 and air mixing system 320 are configured similar to that shown and described with respect to FIG. 2, and thus, for simplicity, similar features will not be described again. The air mixing system 320 includes a plurality of extraction conduits and a heat exchanger that are configured to supply conditioned air into an onboard injector supply chamber 340 for mixing. FIG. 3A is a side cross-sectional view of the combustor section 322 and FIG. 3B is a partial sectional view as viewed along the dashed line 3B-3B.

Figure 11:
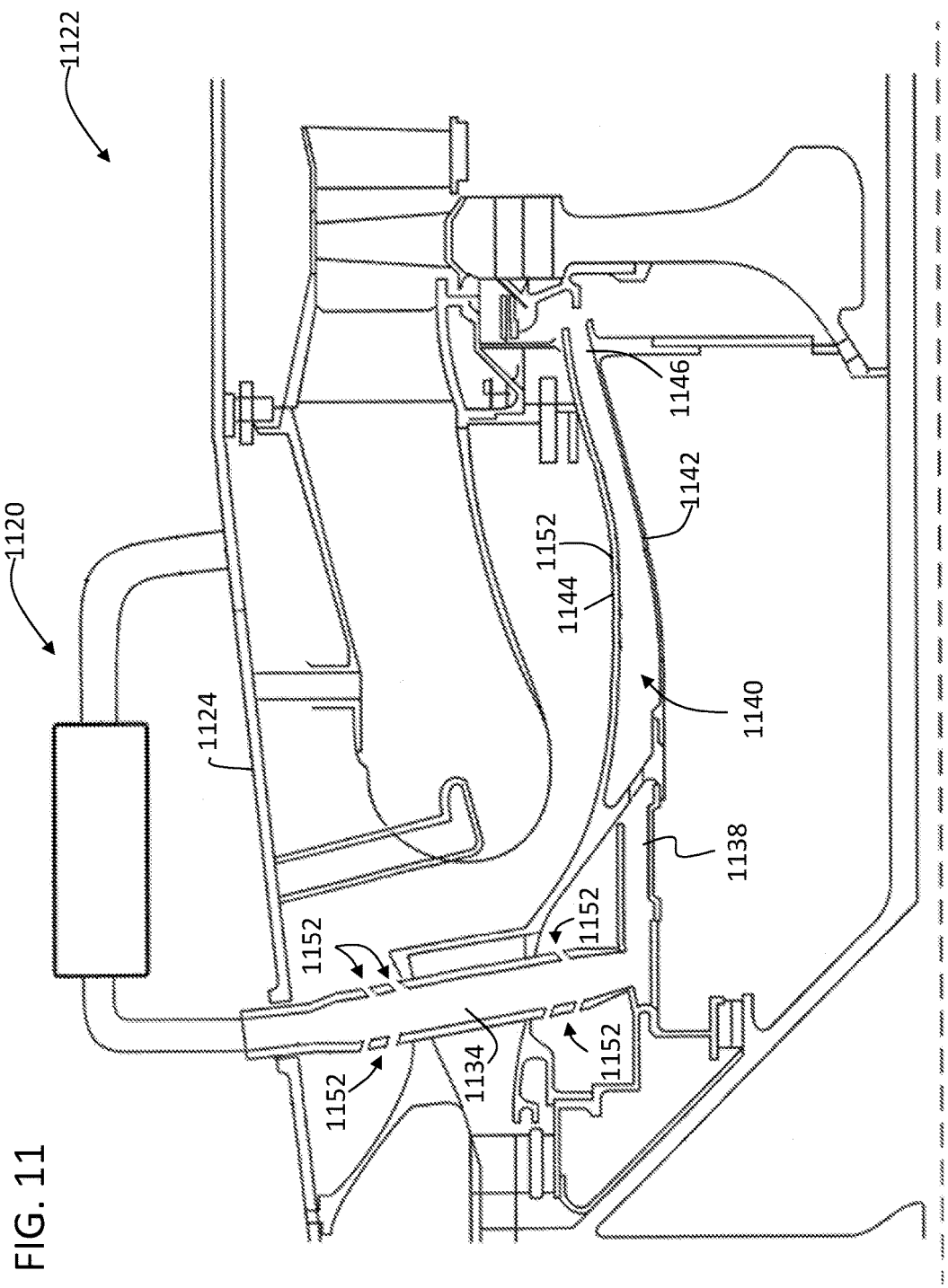
FIG. 11 is a schematic illustration of an alternative configuration of an air mixing system in accordance with embodiments of the present disclosure.

Turning now to FIG. 11, an alternative configuration of an air mixing system 1120 in accordance with an embodiment of the present disclosure is schematically shown. As shown, a structure of a combustor section 1122 is similar to that shown and described above. Further, as shown, the air mixing system 1120 has a similar structure and fluid passage as shown and described above. In the embodiment of FIG. 11, the air mixing system 1120 includes a plurality of mixing chamber apertures 1152 formed in the structure of an extraction conduit, as shown a third extraction conduit 1134. In this embodiment, an outer diameter wall 1144 does not include mixing chamber apertures. An onboard injector supply chamber 1140 is defined between an inner diameter wall 1142 and the outer diameter wall 1144. As shown, the onboard injector supply chamber 1140 is fluidly connected to injection conduits 1138 at a forward end and fluidly connected to an onboard injector 1146 at an aft end of the onboard injector supply chamber 1140.

In the embodiment shown in FIG. 11, the mixing described above occurs within the extraction conduit where it passes through a diffuser case 1124 and through the plenum of the combustor section 1122. Because the extraction conduit 1134 passes from the outer diameter of the combustor section 1122 toward the inner diameter of the combustor section 1122, warm, untreated air will surround the extraction conduit 1134. The warm, untreated air can be sourced and fed into the extraction conduit 1134 to be mixed with cool, treated air that exits the heat exchanger.

Although shown in FIG. 11 with a double-walled structure, those of skill in the art will appreciate that the mixing chamber configuration shown therein is not so limited. For example, a single-walled or multi-walled (e.g., two or more) extraction conduit can be installed to pass from the outer diameter to the inner diameter of the combustion section 1122. In such configuration, the thermal interaction between the air within the plenum of the combustor section 1122 and the extraction conduit 1134 can provide additional and/or alternative thermal treatment of the cooled air after it exits the heat exchanger. Those of skill in the art will appreciate that other configurations are possible without departing from the scope of the present disclosure. For example, in some embodiments, a combination of mixing chamber apertures can be configured along the extraction conduits and on the walls of the onboard injector supply chamber (e.g., a combination of the embodiments shown in FIGS. 2 and 11).

Although a limited number of configurations are shown and described herein, those of skill in the art will appreciate that other configurations, geometries, and/or orientations are possible without departing from the scope of the present disclosure. That is, embodiments provided herein are directed to air mixing systems that can enable efficient cooling of rotor disks and/or blades by decreasing a temperature of cooling air provided through an onboard injector of the gas turbine engine. Such mixing provided herein can decrease the amount of air needed for cooling and/or decrease the need for other forms of air conditioning and/or cooling. Additionally, embodiments of the present disclosure can increase the amount of air available to perform work in the engine. Additionally, air mixing systems provided herein can minimize heat transfer into cooled air as the cooled air passes through the diffuser case. As a result, air mixing systems of the present disclosure can increase engine efficiency by limiting air extracted from the gas path.

Embodiments of the present disclosure are directed, in part, to providing a mixing chamber and/or fluid supply path to an onboard injector that is positioned radially inward from a combustor of a gas turbine engine. Advantageously, warm air that is surrounding the combustion chamber can be leached or bled into a mixing chamber to condition cooled air and thus provide optimally conditioned air to an onboard injector and thus provide efficient cooling to a rotor disk and/or blades of a gas turbine engine.

Benefits and other advantages have been described herein with regard to the various embodiments shown and detailed herein. It should be noted that many alternative or additional functional relationships or physical connections may be present in systems that incorporate air mixing systems as described herein.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

For example, although the term "tube" implies circular or round, the tubes of the present disclosure are not so limited. The tubes of the present disclosure can be square, round, or have other geometry as desired, and such geometry can be selected to optimize the mixing and/or supply of air to the onboard injector. Further, although shown with rib-like structure in some embodiments, those of skill in the art will appreciate that other structures or geometries are possible without departing from the scope of the present disclosure. For example, in some configurations, the structural supports can form a web-like configuration within the onboard injector supply chamber. In such configurations, the structural supports can include through-holes that enable airflow to flow through the onboard injector supply chamber. Such through-holes can be configured to optimize mixing of air without the onboard injector supply chamber.

Accordingly, the present disclosure is not to be seen as limited by the foregoing description, but is only limited by the scope of the appended claims.

What is claimed is:

1. An air mixing system for a gas turbine engine, comprising:
   a heat exchanger;
   a first extraction conduit fluidly coupled to an inlet of the heat exchanger;
   a second extraction conduit fluidly coupled to an outlet of the heat exchanger;
   an injection conduit fluidly coupled to the second extraction conduit;
   an onboard injector supply chamber fluidly coupled to the injection conduit;
   an onboard injector fluidly coupled to the onboard injector supply chamber; and
   a third extraction conduit fluidly coupled between the second extraction conduit and the injection conduit, wherein the third extraction conduit has a double-walled architecture,
   wherein the heat exchanger is configured to supply cooled air to the second extraction conduit, and
   at least one mixing aperture formed in the double-walled architecture of the third extraction conduit to enable warm air to enter the third extraction conduit and mix with the cooled air.

2. The air mixing system for the gas turbine engine of claim 1, further comprising at least one second mixing aperture formed in a wall that defines the onboard injector supply chamber to enable the warm air to enter the onboard injector supply chamber and mix with the cooled air.

3. The air mixing system for the gas turbine engine of claim 1, further comprising at least one structural support within the onboard injector supply chamber configured to support at least one wall defining the onboard injector supply chamber.

4. The air mixing system for the gas turbine engine of claim 3, wherein the at least one structural support extends from a turning vane of the onboard injector into the onboard injector supply chamber.

5. The air mixing system for the gas turbine engine of claim 3, wherein the at least one structural support comprises a plurality of pedestals, columns, pillars, posts, and/or struts formed within the onboard injector supply chamber.

6. The air mixing system for the gas turbine engine of claim 3, wherein the at least one structural support fluidly separates the onboard injector supply chamber into at least two subchambers.

7. The air mixing system for the gas turbine engine of claim 1, wherein the onboard injector supply chamber is formed from a plurality of tubes extending from the injection conduit to the onboard injector.

8. The air mixing system for the gas turbine engine of claim 7, further comprising a header formed between the injection conduit and at least one of the plurality of tubes.

9. A gas turbine engine, comprising:
   a compressor;
   a combustor in fluid communication with the compressor;
   a rotor disk having a plurality of blades in fluid communication with the combustor;
   an onboard injector configured to supply cooling air to the rotor disk; and
   an air mixing system, having:
   a heat exchanger;
   a first extraction conduit fluidly coupled to an inlet of the heat exchanger and fluidly coupled to a plenum surrounding the combustor;
   a second extraction conduit fluidly coupled to an outlet of the heat exchanger;
   an injection conduit fluidly coupled to the second extraction conduit;
   an onboard injector supply chamber fluidly coupled to the injection conduit and the onboard injector; and
   a third extraction conduit fluidly coupled between the second extraction conduit and the injection conduit, wherein the third extraction conduit has a double-walled architecture and extends through a portion of the plenum,
   wherein the heat exchanger is configured to supply cooled air to the second extraction conduit, and
   at least one mixing aperture formed in the double-walled architecture of the third extraction conduit to enable warm air to enter the third extraction conduit and mix with the cooled air to generate the cooling air.

10. The gas turbine engine of claim 9, further comprising at least one second mixing aperture formed in a wall that defines the onboard injector supply chamber to enable the warm air to enter the onboard injector supply chamber from a portion of the plenum and mix with the cooled air within the onboard injector supply chamber.

11. The gas turbine engine of claim 9, further comprising at least one structural support within the onboard injector supply chamber configured to support at least one wall defining the onboard injector supply chamber.

12. The gas turbine engine of claim 11, wherein the at least one structural support extends from a turning vane of the onboard injector into the onboard injector supply chamber.

13. The gas turbine engine of claim 11, wherein the at least one structural support comprises a plurality of pedestals, columns, pillars, posts, and/or struts formed within the onboard injector supply chamber.

14. The gas turbine engine of claim 11, wherein the at least one structural support fluidly separates the onboard injector supply chamber into at least two subchambers.

15. The gas turbine engine of claim 9, wherein the onboard injector supply chamber is formed from a plurality of tubes extending from the injection conduit to the onboard injector.

16. The gas turbine engine of claim 15, further comprising a header formed between the injection conduit and at least one of the plurality of tubes.

* * * * *